(12) United States Patent
Hashimoto et al.

(10) Patent No.: US 11,125,178 B2
(45) Date of Patent: Sep. 21, 2021

(54) STATE DETECTION SYSTEM FOR INTERNAL COMBUSTION ENGINE, DATA ANALYSIS DEVICE, AND VEHICLE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/908,985

(22) Filed: Jun. 23, 2020

(65) Prior Publication Data

US 2021/0033039 A1    Feb. 4, 2021

(30) Foreign Application Priority Data

Aug. 1, 2019    (JP) .............................. JP2019-141882

(51) Int. Cl.
*F02D 41/14*    (2006.01)
*F02D 41/24*    (2006.01)
(Continued)

(52) U.S. Cl.
CPC .......... *F02D 41/1498* (2013.01); *B60K 17/04* (2013.01); *F02D 41/009* (2013.01);
(Continued)

(58) Field of Classification Search
CPC ........ F02D 41/00; F02D 41/009; F02D 41/14; F02D 41/1405; F02D 41/1454;
(Continued)

(56) References Cited

U.S. PATENT DOCUMENTS 5,442,955 A * 8/1995 Baba ................... F02D 41/1498
340/439
5,539,644 A    7/1996 Ichikawa et al.
(Continued)

FOREIGN PATENT DOCUMENTS

JP    04-091348 A    3/1992
JP    3743073 B2    2/2006

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A state detection system for an internal combustion engine includes: a memory configured to store mapping data, the mapping data being data that defines a detection mapping, the detection mapping being a mapping between an input and an output, the input being a rotation waveform variable and a drive system rotation speed variable and the output being a value of a combustion state variable, and the detection mapping including a joint operation of the rotation waveform variable and the drive system rotation speed variable based on a parameter learned by machine learning; and a processor configured to execute an acquisition process and a determination process, the acquisition process being configured to acquire a value of the drive system rotation speed variable, the determination process being configured to determine whether or not the internal combustion engine is in a predetermined operating state.

11 Claims, 9 Drawing Sheets

(51) Int. Cl.
*G07C 5/08* (2006.01)
*F02D 41/26* (2006.01)
*B60K 17/04* (2006.01)
*F16H 63/50* (2006.01)
*F02D 41/00* (2006.01)

(52) U.S. Cl.
CPC ..... *F02D 41/1454* (2013.01); *F02D 41/2406* (2013.01); *F02D 41/26* (2013.01); *F16H 63/50* (2013.01); *G07C 5/085* (2013.01); *F02D 2200/50* (2013.01)

(58) Field of Classification Search
CPC .. F02D 41/1479; F02D 41/1498; F02D 41/24; F02D 41/2406; F02D 41/2429; F02D 41/2454; F02D 41/2461; F02D 41/34; F02D 2200/101; F02D 2200/102; F02D 2200/50; B60W 10/06; B60W 10/08; B60W 10/30; B60W 20/15; B60K 6/22; B60K 17/04; B60K 20/15; F16H 63/50; G07C 5/08; G07C 5/085
USPC .................................................. 701/110–115
See application file for complete search history.

(56) References Cited

U.S. PATENT DOCUMENTS

| | | |
|---|---|---|
| 5,576,963 A | 11/1996 | Ribbens et al. |
| 7,665,558 B2 | 2/2010 | Akimoto et al. |
| 9,399,963 B2 | 7/2016 | Loucks et al. |
| 2003/0163242 A1 | 8/2003 | Miyauchi et al. |
| 2015/0032358 A1* | 1/2015 | Amemiya ........... B60L 15/2054 701/104 |
| 2015/0051817 A1* | 2/2015 | Murata ................ F01L 1/3442 701/112 |
| 2017/0203753 A1* | 7/2017 | Imai ..................... B60W 10/06 |

* cited by examiner

STATE DETECTION SYSTEM FOR INTERNAL COMBUSTION ENGINE, DATA ANALYSIS DEVICE, AND VEHICLE

INCORPORATION BY REFERENCE

The disclosure of Japanese Patent Application No. 2019-141882 filed on Aug. 1, 2019 including the specification, drawings and abstract is incorporated herein by reference in its entirety.

BACKGROUND

1. Technical Field

The present disclosure relates to a system for detecting an operating state involving variation in combustion state between cylinders in an internal combustion engine mounted on a vehicle, a data analysis device constituting the system, and a vehicle.

2. Description of Related Art

In internal combustion engines, when the combustion states of cylinders vary due to a misfire, a variation in air-fuel ratio, or the like, rotation fluctuation of a crankshaft increases. Accordingly, it is possible to detect the misfire, the variation in air-fuel ratio, or the like based on the rotation fluctuation patterns of the crankshaft. For example, Japanese Patent Application Publication No. 4-91348 discloses a misfire detection system that detects a misfire using a hierarchical neural circuit model. The hierarchical neural circuit model is configured such that time series data, obtained by sampling the rotation speed of a crankshaft of an internal combustion engine in each given cycle, is input into an input layer, and information on the cylinder where a misfire has occurred is output from an output layer.

SUMMARY

Now, in an internal combustion engine mounted on a vehicle, a drive system that transmits motive power to driving wheels influences the rotation behavior of a crankshaft. There is a concern that such influence may deteriorate the accuracy of detecting a misfire or the like based on the rotation fluctuation patterns of the crankshafts as described above.

A state detection system for an internal combustion engine according to a first aspect of the present disclosure is applied to the internal combustion engine mounted on a vehicle. The state detection system is configured to detect a predetermined operating state of the internal combustion engine that involves a variation in combustion state between cylinders. The state detection system includes: a memory; and a processor. The memory is configured to store mapping data. The mapping data is data that defines a detection mapping, the detection mapping being a mapping between an input and an output, the input being a rotation waveform variable and a drive system rotation speed variable and the output being a value of a combustion state variable, and the detection mapping including a joint operation of the rotation waveform variable and the drive system rotation speed variable based on a parameter learned by machine learning. The rotation waveform variable is a variable including information on a difference in rotation speed of a crankshaft between the cylinders of the internal combustion engine during a period when combustion torque is generated in each of the cylinders. The drive system rotation speed variable is a variable indicating information on a rotation speed of a drive system rotating element that is a rotating element disposed in a power transmission line between the internal combustion engine and driving wheels. The combustion state variable is a variable relating to a variation degree in combustion state between the cylinders. The processor is configured to execute an acquisition process and a determination process. The acquisition process is configured to acquire a value of the rotation waveform variable based on an output of a sensor that detects rotation behavior of the crankshaft and to acquire a value of the drive system rotation speed variable based on an output of a sensor that detects rotation behavior of the drive system rotating element. The determination process is configured to determine whether or not the internal combustion engine is in the predetermined operating state, based on an output value of the detection mapping that takes the values of the rotation waveform variable and the drive system rotation speed variable acquired in the acquisition process as an input.

When the combustion state varies between the cylinders, the combustion torque in each of the cylinders becomes different, which causes a difference in rotation speed of the crankshaft between the cylinders, during the period when combustion torque is generated in each of the cylinders. The information on such difference in rotation speed of the crankshaft between the cylinders can be acquired from the output of the sensor that detects the rotation behavior of the crankshaft. When the difference in rotation speed of the crankshaft between the cylinders during the period of combustion torque generation is simply caused by only a variation in combustion torque between the cylinders, it is possible to accurately detect, from the information on the difference in rotation speed between the cylinders, the operating state of the internal combustion engine that involves a variation in combustion state of the cylinders due to a misfire, an air-fuel ratio imbalance between the cylinders, or the like. Under these circumstances, in the above configuration, in consideration that the variation in combustion state between cylinders causes a difference in rotation speed of the crankshaft during the combustion torque generation period, an input to the detection mapping includes the rotation waveform variable including the information on the difference in rotation speed between cylinders.

Meanwhile, in the internal combustion engine mounted on the vehicle, the drive system that transmits the motive power of the internal combustion engine to the driving wheels influences the rotation behavior of the crankshaft. To cope with this situation, in the above configuration, the input to the detection mapping also includes the drive system rotation speed variable indicating information on the rotation speed of a drive system rotating element that is a rotating element disposed in a power transmission line between the internal combustion engine and the driving wheels. In the configuration, the presence or absence of an occurrence of the predetermined operating state is determined based on the value of a combustion state variable calculated through join operation of the rotation waveform variable and the drive system rotation speed variable based on a parameter learned by machine learning. The parameter referred herein can be learned based on the presence or absence of an occurrence of the predetermined operating state when the rotation waveform variable and the drive system rotation speed variable as described above take various values. Accordingly, the state detection can be conducted by taking the influence that the drive system exerts on the rotation behavior of the crankshaft into accounts. Therefore, the detecting accuracy of the predetermined operating state in the internal combustion engine mounted on the vehicle can be enhanced.

In the above aspect, the predetermined operating state may be a state where a misfire has occurred. In the above aspect, the predetermined operating state may be a state where an air-fuel ratio varies between the cylinders. In the aspect, the drive system rotating element may be a transmission input shaft. Incidentally, examples of the drive system rotating element that can provide the rotation speed may include a transmission output shaft and a driving wheel shaft, in addition to the transmission input shaft.

In the above aspect, the drive system rotation speed variable may be a variable indicating time series data of the rotation speed of the drive system rotating element. In this case, it becomes possible to detect the rotation fluctuation that reflects a delay until the change in rotation speed of the drive system rotating element influences the rotation behavior of the crankshaft.

In the above aspect, when it is determined by the determination process that the internal combustion engine is in the predetermined operating state, the processor may be configured to operate prescribed hardware to execute a handling process for handling the predetermined operating state. The handling process includes, for example, a process of notifying an occupant that the internal combustion engine is in the predetermined operating state, and a process of elimination or reducing the predetermined operating state.

In the above aspect, the determination process may include an output value calculation process for calculating an output value of the detection mapping that takes the values of the rotation waveform variable and the drive system rotation speed variable acquired in the acquisition process as an input. The processor may include a first processor mounted on the vehicle, and a second processor disposed outside the vehicle. The first processor may be configured to execute the acquisition process and a vehicle-side reception process for receiving a signal based on a calculation result of the output value calculation process. The second processor may be configured to execute the output value calculation process and an outer-side transmission process for transmitting to the vehicle a signal based on the calculation result of the output value calculation process. In this case, the output value calculation process that is high in arithmetic load is performed outside the vehicle.

A data analysis device according to a second aspect of the present disclosure includes the second processor and the memory.

A vehicle according to a third aspect of the present disclosure includes the first processor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a state detection system for an internal combustion engine will be described in detail with reference to FIGS. 1 to 3.

Figure 1:
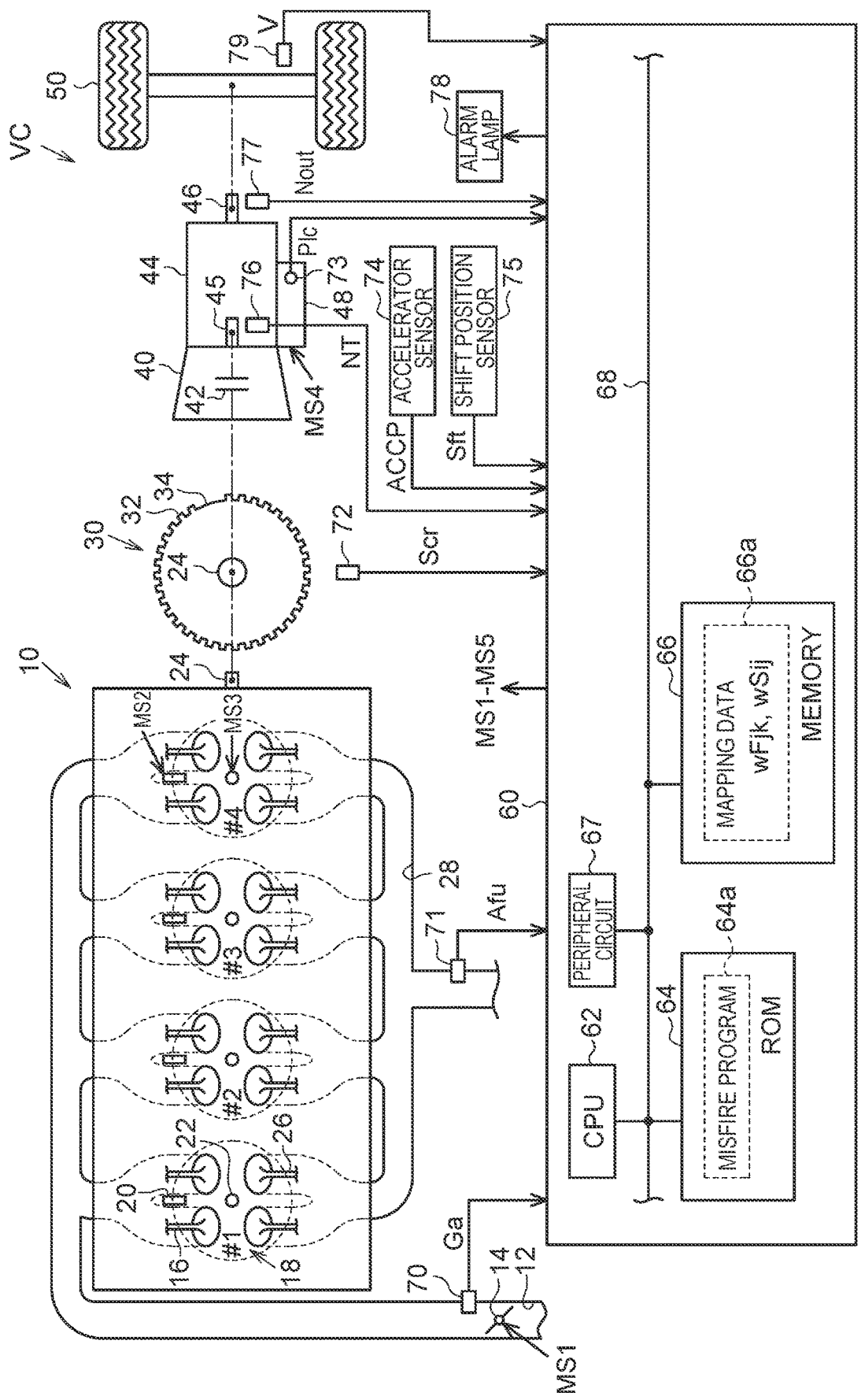
FIG. 1 schematically shows the configuration of a state detection system according to a first embodiment and a drive system of a vehicle that incorporates an internal combustion engine to which the state detection system is applied.

In an internal combustion engine 10 mounted on a vehicle VC shown in FIG. 1, an intake passage 12 is equipped with a throttle valve 14. The air taken in from the intake passage 12 flows into combustion chambers 18 of cylinders #1 to #4, when intake valves 16 are opened. Fuel is injected into the combustion chambers 18 with fuel injection valves 20. In the combustion chambers 18, mixture of air and fuel is used for combustion through spark discharge by ignition devices 22. Energy generated by combustion is taken out as rotational energy of a crankshaft 24. The air-fuel mixture used for combustion is discharged to an exhaust passage 28 as an exhaust gas, when exhaust valves 26 are opened.

The crankshaft 24 is joined with a crank rotor 30 provided with a plurality of (thirty-four herein) tooth portions 32 indicative of a rotation angle of the crankshaft 24. Although the crank rotor 30 is basically provided with the tooth portions 32 at intervals of 10° CA, an untoothed portion 34 is provided in a spot where an interval with the adjacent tooth portions 32 is 30° CA. The untoothed portion 34 is provided to indicate a reference rotation angle of the crankshaft 24. In the vicinity of the crank rotor 30, a crank angle sensor 72 is disposed. The crank angle sensor 72 converts a change in magnetic flux, corresponding to approach and separation of the tooth portions 32, into a pulse signal with a square wave, and outputs the pulse signal. In the following description, such an output signal of the crank angle sensor 72 is stated as a crank signal Scr. In the present embodiment, the crank angle sensor 72 corresponds to the sensor that detects the rotation behavior of the crankshaft 24.

A change gear 44 is provided in a power transmission line from the crankshaft 24 of the internal combustion engine 10 to driving wheels 50 of the vehicle VC. The change gear 44 has a transmission input shaft 45 that is an input shaft of the motive power from the crankshaft 24, and a transmission output shaft 46 that is an output shaft of the motive power toward the driving wheels 50. Through hydraulic control by a hydraulic circuit 48, the change gear 44 changes a gear ratio that is a ratio of the rotation speed of the transmission output shaft 46 to the rotation speed of the transmission input shaft 45. The change gear 44 is equipped with an input shaft speed sensor 76 that detects an input shaft rotation speed NT that is the rotation speed of the transmission input shaft 45, and an output shaft speed sensor 77 that detects an output shaft speed Nout that is the rotation speed of the transmission output shaft 46. Incidentally, the change gear 44 may be one of a stepped change gear that discretely switches the gear ratio and a stepless transmission that continuously switches the gear ratio.

In a portion of the power transmission line between the crankshaft 24 and the transmission input shaft 45, a torque converter 40 is provided. The torque converter 40 transmits torque between the crankshaft 24 and the transmission input shaft 45 through oil that is filled therein. The torque converter 40 is also equipped with a lock-up clutch 42. When the lock-up clutch 42 is engaged, torque is directly transmitted to the transmission input shaft 45 from the crankshaft 24 without through the oil. The engagement of the lock-up clutch 42 is controlled by adjustment of a lock-up hydraulic pressure Plc by the hydraulic circuit 48.

The vehicle VC further includes a controller 60. The controller 60 includes a CPU 62, a ROM 64, a memory 66 that is an electrically rewritable nonvolatile memory, and a peripheral circuit 67, which can communicate with each other through a bus 68. The peripheral circuit 67 includes a circuit for generating a clock signal that defines internal operation, an electric power source circuit, and a reset circuit.

The controller 60 controls the internal combustion engine 10. In order to control controlled variables such as torque and an exhaust gas component ratio, the controller 60 operates operation units, such as the throttle valve 14, the fuel injection valves 20, and the ignition devices 22 of the internal combustion engine 10. The controller 60 also controls the change gear 44. In order to control the controlled variable that is the gear ratio, the controller 60 operates the hydraulic circuit 48. The controller 60 further controls the lock-up clutch 42. In order to control the controlled variable that is the lock-up hydraulic pressure Plc, the controller 60 operates the hydraulic circuit 48. The controller 60 controls the internal combustion engine 10, the change gear 44, and the lock-up clutch 42 by causing the CPU 62 to execute programs stored in the ROM 64. In FIG. 1, operation signals MS1 to MS4 of the throttle valve 14, the fuel injection valves 20, the ignition devices 22, and the hydraulic circuit 48 are illustrated.

When controlling the controlled variables as described above, the controller 60 refers to an intake air amount Ga detected by an air flowmeter 70, the crank signal Scr of the crank angle sensor 72, an accelerator operation amount ACCP that is a depression amount of an accelerator pedal detected by an accelerator sensor 74, and an operation position Sft of a shift lever detected by a shift position sensor 75. The controller 60 also refers to the lock-up hydraulic pressure Plc detected by an oil pressure sensor 73 provided in the hydraulic circuit 48, the input shaft rotation speed NT detected by the input shaft speed sensor 76, the output shaft speed Nout detected by the output shaft speed sensor 77, a wheel speed V that is the rotation speed of the driving wheels 50 detected by the wheel speed sensor 79, or the like. The exhaust passage 28 is equipped with an air-fuel ratio sensor 71. When controlling the controlled variables, the controller 60 also refers to a detection value of the air-fuel ratio sensor 71. Incidentally, the air-fuel ratio sensor 71 outputs a detection signal corresponding to the components of exhaust gas before being cleaned by an exhaust gas cleaning catalyst. The detection value corresponds to the air-fuel ratio of an air-fuel mixture combusted in the combustion chambers 18 of the cylinders #1 to #4. In the following description, the detection value of the air-fuel ratio sensor 71 is stated as an upstream-side detection value Afu.

When controlling the controlled variables, the controller 60 also refers to the rotation speed NE of the crankshaft 24. The CPU 62 calculates the rotation speed NE of the crankshaft 24 based on the aforementioned crank signal Scr. Incidentally, the rotation speed NE is desirably an average value of the rotation speeds when the crankshaft 24 rotates by a rotation angle equal to or greater than one rotation of the crankshaft 24. Without being limited to the value obtained by simple arithmetic average, the average value may be obtained by, for example, an index moving average process. In that case, the average value is calculated based on time series data of the crank signal Scr when the crankshaft 24 rotates by a rotation angle of one rotation or more.

Furthermore, while the internal combustion engine 10 is in operation, the controller 60 determines the presence or absence of a misfire. In the present embodiment, the controller 60 that detects the presence or absence of such a misfire corresponds to the state detection system.

Figure 2:
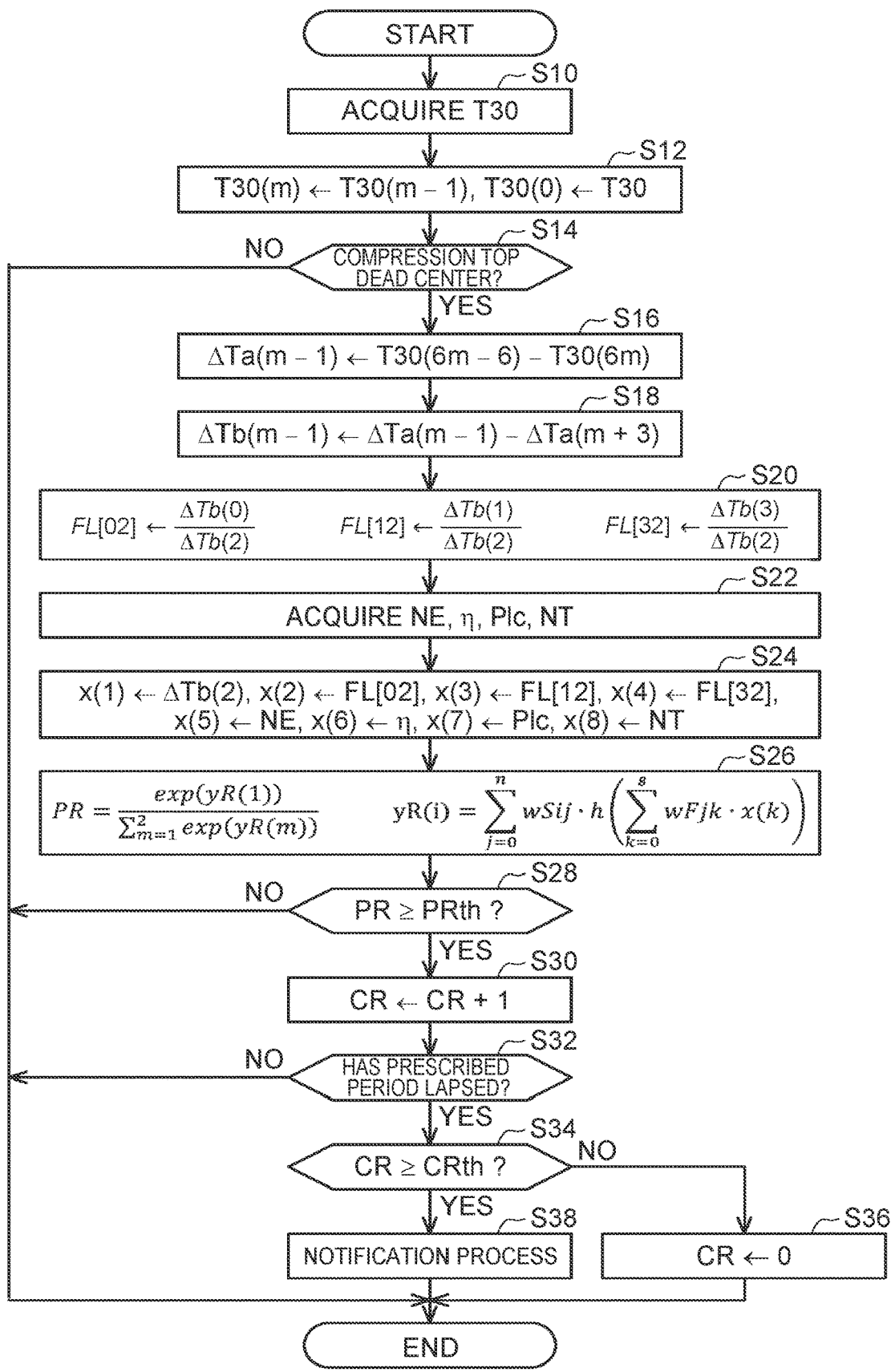
FIG. 2 is a flowchart of a process defined as a misfire program executed by a controller provided in the state detection system of the first embodiment.

FIG. 2 shows the procedure of a process relating to detection of a misfire. The process shown in FIG. 2 is implemented when the CPU 62 repeatedly executes a misfire program 64$a$ stored in the ROM 64 in every control cycle. Hereinafter, the step number of each process will be expressed by numerals prepended with "S".

In a series of processes shown in FIG. 2, the CPU 62 first acquires minute rotation time T30 (S10). The CPU 62 calculates the minute rotation time T30 by checking the time taken for the crankshaft 24 to rotate by 30° CA, based on the crank signal Scr of the crank angle sensor 72. Next, the CPU 62 sets latest minute rotation time T30 acquired in the process of S10 as minute rotation time T30(0). As the minute rotation time T30 is older, a variable "m" in the minute rotation time T30($m$) becomes larger (S12). More specifically, on the assumption that "m=1, 2, 3, . . .", minute rotation time T30($m$-1) immediately before execution of the process of S12 is defined as minute rotation time T30($m$). Hence, for example, the minute rotation time T30, acquired in the process of S10 when the process of FIG. 2 is executed last time, becomes minute rotation time T30(1).

Next, the CPU 62 determines whether or not the minute rotation time T30 acquired in the process of S10 is equal to the time taken for rotation at an angular interval from 30° CA before a compression top dead center to the compression top dead center in any one of the cylinders #1 to #4 (S14). When determining that the minute rotation time T30 is the time taken for rotation at the angular interval to the compression top dead center (S14: YES), the CPU 62 first calculates a value of a rotation waveform variable as an input of the process of determining the presence or absence of a misfire so as to determine the presence or absence of a misfire in the cylinder that has reached the compression top dead center before 360° CA.

Specifically, the CPU 62 first calculates, as an inter-cylinder variable ΔTa, a difference between values of the minute rotation time T30 relating to the angular interval from 30° CA before the compression top dead center to the compression top dead center, the values being separated by 180° from each other (S16). More specifically, on the assumption that "m=1, 2, 3. . .", the CPU 62 sets an inter-cylinder variable ΔTa($m$-1) to "T30(6$m$-6)-T30(6$m$)".

Figure 3:
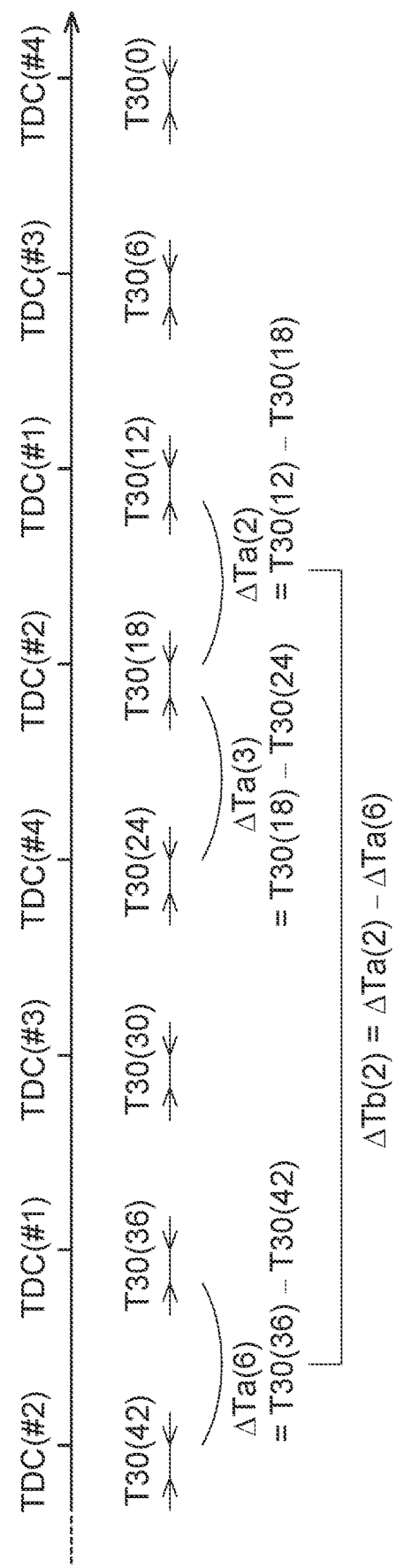
FIG. 3 shows a setting mode of input variables of a mapping in the embodiment.

FIG. 3 illustrates the inter-cylinder variable ΔTa. In the present embodiment, the compression top dead center appears in order of the cylinder #1, the cylinder #3, the cylinder #4, and the cylinder #2, and power stroke starts in this order. FIG. 3 indicates that the target for detecting the presence or absence of a misfire is the cylinder #1 by acquiring the minute rotation time T30 of the cylinder #4 at an angular interval from 30° CA before the compression top dead center to the compression top dead center in the process of S10. In this case, an inter-cylinder variable ΔTa(0) is a difference between the minute rotation time T30 corresponding to the compression top dead center of the cylinder #4 and the minute rotation time T30 corresponding to the compression top dead center of the cylinder #3 which was at the compression top dead center before the cylinder #4. FIG. 3 indicates that an inter-cylinder variable ΔTa(2) is a difference between the minute rotation time T30(12) corresponding to the compression top dead center of the cylinder #1 that is a detection target of a misfire and the minute rotation time T30(18) corresponding to the compression top dead center of the cylinder #2.

With reference to FIG. 2 again, the CPU 62 calculates an inter-cylinder variable ΔTb that is a difference between values separated by 720° CA from each other, out of the inter-cylinder variables ΔTa(0), ΔTa(1), ΔTa (2), . . . (S18). Specifically, on the assumption that "m=1, 2, 3. . .", the CPU 62 sets an inter-cylinder variable ΔTb(m−1) to "ΔTa(m−1)−ΔTa (m+3)".

FIG. 3 illustrates the inter-cylinder variable ΔTb. In FIG. 3, the inter-cylinder variable ΔTb(2) is stated as "ΔTa(2)−Ta(6)." Next, the CPU 62 calculates a fluctuation pattern variable FL indicating a relative size relation between the inter-cylinder variable ΔTb corresponding to the cylinder that is the detection target of a misfire and the inter-cylinder variable ΔTb corresponding to other cylinders (S20). In the present embodiment, fluctuation pattern variables FL[02], FL[12], FL[32] are calculated.

Here, the fluctuation pattern variable FL[02] is defined by "ΔTb(0)/ΔTb(2)." More specifically, when the example of FIG. 3 is used, the fluctuation pattern variable FL[02] is a value obtained by dividing the inter-cylinder ΔTb(0), corresponding to the cylinder #4 that will be at the compression top dead center after the cylinder#1 and cylinder #3, by the inter-cylinder ΔTb(2) corresponding to the cylinder #1 that is the detection target of a misfire. The fluctuation pattern variable FL[12] is defined by "ΔTb(1)/ΔTb(2)." More specifically, when the example of FIG. 3 is used, the fluctuation pattern variable FL[12] is a value obtained by dividing an inter-cylinder ΔTb(1), corresponding to the cylinder #3 that will be at the compression top dead center after the cylinder#1, by the inter-cylinder ΔTb(2) corresponding to the cylinder #1 that is the detection target of a misfire. The fluctuation pattern variable FL[32] is defined by "ΔTb(3)/ΔTb(2)." More specifically, when the example of FIG. 3 is used, the fluctuation pattern variable FL[32] is a value obtained by dividing an inter-cylinder ΔTb(3), corresponding to the cylinder #2 that was at the compression top dead center before the cylinder#1, by the inter-cylinder ΔTb(2) corresponding to the cylinder #1 that is the detection target of a misfire.

In the present embodiment, the thus-calculated values of the inter-cylinder ΔTb(2), and the fluctuation pattern variables FL[02], FL [12], FL [32] are used as information on a difference in rotation speed of the crankshaft 24 between the cylinders during the period when combustion torque is generated in each of the cylinders.

Next, the CPU 62 acquires values of the rotation speed NE, a charging efficiency η, the lock-up hydraulic pressure Plc, and the input shaft rotation speed NT (S22). The CPU 62 then substitutes the value of the rotation waveform variable acquired in the processes of S18, S20, and the values of the variable acquired in the process of S22 into input variables x(1) to x(8) of a mapping that outputs a combustion state variable PR that is a variable regarding the probability of occurrence of a misfire in the cylinder that is a detection target (S24). Specifically, in the process of S24, the CPU 62 substitutes the value of the inter-cylinder ΔTb(2) into the input variable x(1), the value of the fluctuation pattern variable FL[02] into the input variable x(2), the value of the fluctuation pattern variable FL[12] into the input variable x(3), and the value of the fluctuation pattern variable FL[32] into the input variable x(4), respectively. The CPU 62 also substitutes the value of the rotation speed NE into the input variable x(5), the value of the charging efficiency η into the input variable x(6), the value of the lock-up hydraulic pressure Plc into the input variable x(7), and the value of the input shaft rotation speed NT into the input variable x(8).

Next, the CPU 62 inputs the values of the input variables x(1) to x(8) into the mapping that is defined by mapping data 66a stored in the memory 66 shown in FIG. 1 so as to calculate the value of the combustion state variable PR that is an output value of the mapping (S26).

In the present embodiment, the mapping is constituted of a neural network having one intermediate layer. The neural network includes an activation function h(x) as an input-side nonlinear mapping that performs nonlinear conversion of the outputs of an input-side coefficient wFjk (j=0 to n, k=0 to 8) and an input-side linear mapping that is a linear mapping defined by the input-side coefficient wFjk. In the present embodiment, a function ReLU is illustrated as the activation function h(x). The function ReLU outputs a larger one of an input and "0". Incidentally, the coefficient wFj0 or the like is a bias parameter, and the input variable x(0) is defined as "1". In the following description, the mapping is stated as a detection mapping.

The neural network includes a softmax function that outputs the combustion state variable PR that takes output-side coefficient wSij (i=1 to 2, j=0 to n) and prototype variables yR(1), yR(2) as inputs, the prototype variables yR(1), yR(2) being an output of an output-side linear mapping that is a linear mapping defined by the output-side coefficient wSij. Hence, in the present embodiment, the combustion state variable PR is a value representing the magnitude of likelihood that a misfire has actually occurred, the value being quantified as a continuous value in a specified region larger than "0" and smaller than "1".

Next, the CPU 62 determines whether or not the value of the combustion state variable PR is equal to or larger than a determination value PRth (S28). When determining that the value of the combustion state variable PR is equal to or larger than the determination value PRth (S28: YES), the CPU 62 increments a counter CR (S30). The CPU 62 then determines whether or not a prescribed period has lapsed from the time when the process of S28 was first executed or from the time when a process of S36 described later was executed (S32). Here, the prescribed period is longer than the period of one combustion cycle, and is desirably ten times as long as one combustion cycle or longer.

When determining that the prescribed period has lapsed (S32: YES), the CPU 62 determines whether or not the counter CR is equal to or greater than the threshold CRth (S34). The process of S34 is a process of determining whether or not a misfire has occurred at frequency beyond an allowable range. When determining that the counter CR is less than the threshold CRth (S34: NO), the CPU 62 initializes the counter CR (S36). On the contrary, when determining that the counter CR is equal to or greater than the threshold CRth (S34 : YES), the CPU 62 executes a notification process for operating an alarm lamp 78 shown in FIG. 1 in order to encourage a user to cope with the abnormality (S38).

When the processes of S36, S38 are completed, or when negative determination is made in the processes of S14, S28, S32, the CPU 62 temporarily terminates a series of the processes shown in FIG. 2. Incidentally, the mapping data 66a is generated as shown below, for example. That is, the internal combustion engine 10 coupled with the torque converter 40 is installed on a test bench, with a dynamometer being connected to the output shaft of the torque converter 40. Then, the internal combustion engine 10 is operated on the test bench, and fuel injection is stopped at a timing randomly selected out of the timing when fuel injection is requested in each of the cylinders #1 to #4. In the cylinder where fuel injection is stopped, data on the combustion state variable PR having a value of "1" is used as teacher data, while in the cylinders where fuel injection is not stopped, data on the combustion state variable PR having a value of "0" is included in teacher data. With use of the rotation waveform variable acquired each time and the value acquired in the process of S22, the value of the combustion state variable PR is calculated by the same processes as in S24, S26. The values of the input-side coefficient wFjk and the output-side coefficient wSij are learned so as to reduce a difference between the thus-learned combustion state variable PR and the teacher data. Specifically, the values of the input-side coefficient wFjk and the output-side coefficient wSij may be learned so as to minimize cross entropy, for example. The input shaft rotation speed NT can be imitated with the rotation speed of the dynamometer.

Here, the functions and effects of the present embodiment will be described. When a misfire occurs in the internal combustion engine 10, combustion torque becomes different between cylinders, which causes an increased fluctuation of the minute rotation time T30. Meanwhile, the crankshaft 24 is coupled with the drive system of the vehicle VC that constitutes the power transmission line from the crankshaft 24 to the driving wheels 50, and such a drive system influences the rotation behavior of the crankshaft 24. Under these circumstances, in the state detection system of the present embodiment, an input to the detection mapping includes the rotation waveform variable including the information on the inter-cylinder difference in rotation speed NE, in consideration that the variation in combustion state between cylinders causes an inter-cylinder difference in rotation speed NE of the crankshaft 24 during the combustion torque generation period.

Meanwhile, in the internal combustion engine 10 mounted on the vehicle VC, the drive system that transmits the motive power of the internal combustion engine 10 to the driving wheels 50 exerts an influence on the rotation behavior of the crankshaft 24. As a solution, in the present embodiment, the lock-up hydraulic pressure Plc and the input shaft rotation speed NT, which are the state quantities of the drive system, are included in the input variables of the detection mapping.

In the present embodiment, the presence or absence of a misfire is determined based on the value of the combustion state variable PR that is calculated by join operation of the rotation waveform variable, the lock-up hydraulic pressure Plc, and the input shaft rotation speed NT, based on the mapping data 66a learned by machine learning. The mapping data 66a here can be learned based on the presence or absence of a misfire when each of the rotation waveform variable, the lock-up hydraulic pressure Plc, and the input shaft rotation speed NT take various values. Accordingly, misfire detection can be conducted by taking the influence that the drive system exerts on the rotation behavior of the crankshaft 24 into accounts. Therefore, it is possible to enhance the detection accuracy of the misfire in the internal combustion engine 10 mounted on the vehicle VC.

According to the present embodiment described in the foregoing, the operational effects as described below are further achieved. (1) The rotation speed NE and the charging efficiency as operating point variables that define the operating point of the internal combustion engine 10 are used as an input of the detection mapping. The operation amount of the operation units of the internal combustion engine 10, such as the fuel injection valves 20 or the ignition devices 22, tends to be determined based on the operating point of the internal combustion engine 10. Accordingly, the operating point variables are variables including the information regarding the operation amount of each of the operation units. Therefore, when the operating point variables are used as an input of the detection mapping, the value of the combustion state variable PR can be calculated based on the information regarding the operation amount of each of the operation units. As a result, the value of the combustion state variable PR can be calculated with higher accuracy since the rotation behavior of the crankshaft 24 changed by the operation amount is reflected on the combustion state variable PR.

When the operating point variables are used as input variables, the value of the combustion state variable PR is calculated through join operation of the rotation waveform variable and the operating point variable with use of the input-side coefficient wFjk that is a parameter learned by machine learning. Accordingly, it is not required to adapt an adaptation value for every operating point variable. Contrary to this, in the case where, for example, size comparison between the inter-cylinder variable $\Delta Tb$ and a determination value is performed, it is required to adapt the determination value for every operating point variable, which causes an increased number of adaptable processes.

(2) The lock-up hydraulic pressure Plc and the input shaft rotation speed NT are included in the input variables of the detection mapping. This makes it possible to calculate the value of the combustion state variable PR as a value reflecting the influence that the drive system of the vehicle VC exerts on the rotation fluctuation of the crankshaft 24, and by extension to achieve high-accuracy misfire detection reflecting the influence.

(3) The rotation waveform variable used as an input variable x is generated by selectively using the values of the minute rotation time T30 in the vicinity of the compression top dead center. The values of the minute rotation time T30 that show a largest difference due to the presence or absence of a misfire is the values in the vicinity of the compression top dead center. Accordingly, selectively using the values in the vicinity of the compression top dead center, out of the values of the minute rotation time T30, can restrain the dimension of the input variable x from increasing, and can take in the information necessary for determination of the presence or absence of a misfire as much as possible.

(4) The rotation waveform variable includes the inter-cylinder $\Delta Tb(2)$. The inter-cylinder $\Delta Tb(2)$ is a difference in values of the minute rotation time T30 in the vicinity of the compression top dead center between a cylinder that is the target of misfire detection and a cylinder adjacent thereto, the difference being quantified in one dimension in advance. Accordingly, the information necessary for determination of the presence or absence of a misfire can efficiently be taken in with a variable having a small number of dimensions.

(5) The rotation waveform variable includes the fluctuation pattern variable FL in addition to the inter-cylinder ΔTb(2). Since vibration from a road surface, or the like, is overlapped on the crankshaft 24, there is a concern that erroneous determination may be made, if only the inter-cylinder ΔTb(2) is used as the rotation waveform variable. As a solution, in the present embodiment, the value of the combustion state variable PR is calculated using the fluctuation pattern variable FL in addition to the inter-cylinder ΔTb(2). Accordingly, as compared with the case where the value of the combustion state variable PR is calculated only from the inter-cylinder ΔTb(2), the value of the combustion state variable PR can be presented as a value that indicates more accurate degree of likelihood (probability) that a misfire occurred.

Furthermore, in the present embodiment, the value of the combustion state variable PR is calculated through join operation of the inter-cylinder ΔTb(2) and the fluctuation pattern variable FL with use of the input-side coefficient wFjk that is a parameter learned by machine learning. Accordingly, as compared with the case where the presence or absence of a misfire is determined based on the comparison between the inter-cylinder ΔTb(2) and the determination value, and on the comparison between the fluctuation pattern variable FL and the determination value, the presence or absence of a misfire can be determined based on a more detailed relationship between the variables including the inter-cylinder ΔTb(2) and the fluctuation pattern variable FL, and the misfire.

Second Embodiment

Hereinafter, a second embodiment of the state detection system for an internal combustion engine will be described with the attention mainly given to the differences from the first embodiment with reference to the drawings. The state detection system of the present embodiment is similar in configuration to that of the first embodiment except for the contents of the misfire program 64a stored in the ROM 64, and the mapping data 66a stored in the memory 66.

Figure 4:
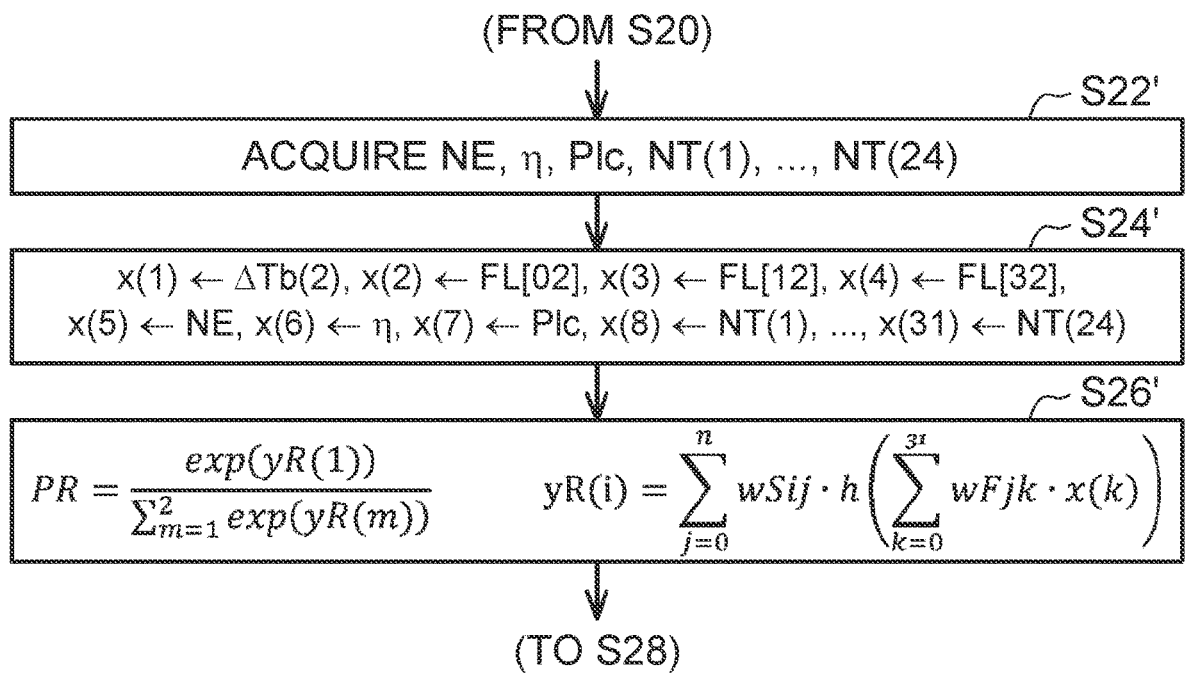
FIG. 4 is a flowchart showing some of the process defined as a misfire program that is executed by the controller provided in the state detection system according to a second embodiment.

The CPU 62 in the state detection system of the present embodiment conducts as a process relating to misfire detection the process shown in FIG. 2 with some modifications. FIG. 4 shows modified portions of the process. Specifically, in the present embodiment, a process of S22' in FIG. 4 is conducted subsequent to the process of S20 in FIG. 2. After the processes of S24', S26' in FIG. 4 are conducted, the processes subsequent to S28 in FIG. 2 are conducted.

In the process of S22' in FIG. 4, the CPU 62 acquires values of the rotation speed NE, the charging efficiency the lock-up hydraulic pressure Plc, and drive system rotation speed variables NT(1) to NT(24). In the drive system rotation speed variables NT(1) to NT(24), following values are stored, respectively. Note that "N" in the following description represents any natural numbers from two to twenty four. Specifically, in every prescribed sampling cycle, the CPU 62 acquires the input shaft rotation speed NT from the output of the input shaft speed sensor 76, and substitutes the acquired value into the drive system rotation speed variable NT(1). At the time, the CPU 62 substitutes a previous value of the drive system rotation speed variable NT(N-1) into the drive system rotation speed variable NT(N). Thus, the time series data of input shaft rotation speed NT in every sampling cycle is stored in the drive system rotation speed variables NT(1) to NT(24).

In the subsequent process of S24', the CPU 62 substitutes the value of the rotation waveform variable acquired in the processes of S18, S20 in FIG. 2 and the values of the variables acquired in the process of S22' into input variables x(1) to x(31) of the detection mapping defined by the mapping data 66a stored in the memory 66. Specifically, in the process of S24', the CPU 62 substitutes the value of the inter-cylinder ΔTb(2) into the input variable x(1), the value of the fluctuation pattern variable FL[02] into the input variable x(2), the value of the fluctuation pattern variable FL[12] into the input variable x(3), and the value of the fluctuation pattern variable FL[32] into the input variable x(4), respectively. The CPU 62 also substitutes the value of the rotation speed NE into the input variable x(5), the value of the charging efficiency η into the input variable x(6), and the value of the lock-up hydraulic pressure Plc into the input variable x(7). The CPU 62 further substitutes the values of the drive system rotation speed variables NT(1) to NT(24) into the input variables x(8) to x(31), respectively.

Next, the CPU 62 inputs the values of the input variables x(1) to x(31) into the detection mapping that is defined by the mapping data 66a so as to calculate the value of the combustion state variable PR that is an output value of the detection mapping (S26').

Such a detection mapping in the present embodiment is constituted of a neural network having one intermediate layer. The neural network includes an activation function h(x) as an input-side nonlinear mapping that performs nonlinear conversion of the outputs of an input-side coefficient wFjk (j=0 to n, k=0 to 31) and an input-side linear mapping that is a linear mapping defined by the input-side coefficient wFjk. The neural network also includes a softmax function that outputs the combustion state variable PR that takes output-side coefficient wSij (i=1 to 2, j=0 to n) and prototype variables yR(1), yR(2) as inputs, the prototype variables yR(1), yR(2) being an output of an output-side linear mapping that is a linear mapping defined by the output-side coefficient wSij.

Thus, in the present embodiment, the time series data of the input shaft rotation speed NT is included in the input variables of the detection mapping. Accordingly, it becomes possible to detect the misfire that reflects a delay until influence of the change in rotation speed of the transmission input shaft 45 appears in the rotation behavior of the crankshaft.

Third Embodiment

Hereinafter, a third embodiment will be described with the attention mainly given to the differences from the first embodiment with reference to the drawings.

Figure 5:
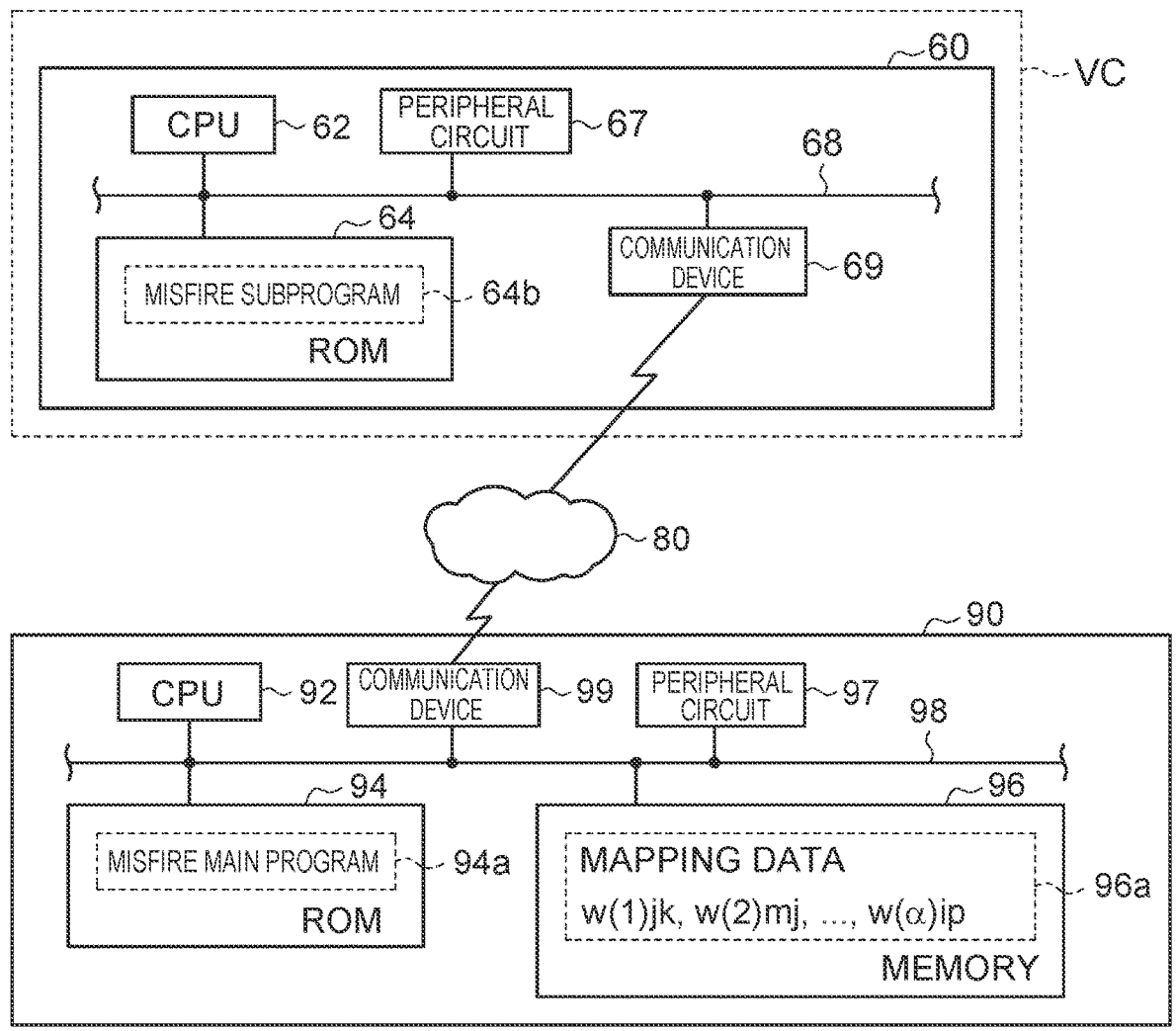
FIG. 5 schematically shows the configuration of the state detection system according to a third embodiment.

In the present embodiment, the process of calculating the combustion state variable PR is performed outside the vehicle. FIG. 5 shows the state detection system according to the present embodiment. In FIG. 5, component members corresponding to those shown in FIG. 1 are designated by the same numerals for convenience.

A controller 60 in a vehicle VC shown in FIG. 5 includes a communication device 69. The communication device 69 is a device for communicating with a center 90 through a network 80 outside the vehicle VC. The center 90 analyzes the data transmitted from a plurality of vehicles VC. The center 90 includes a CPU 92, a ROM 94, a memory 96, a peripheral circuit 97, and a communication device 99, which can communicate through a bus 98. The memory 96 stores mapping data 96a. In the present embodiment, the center 90 and the controller 60 of the vehicles VC constitute a state detection system.

Figure 6:
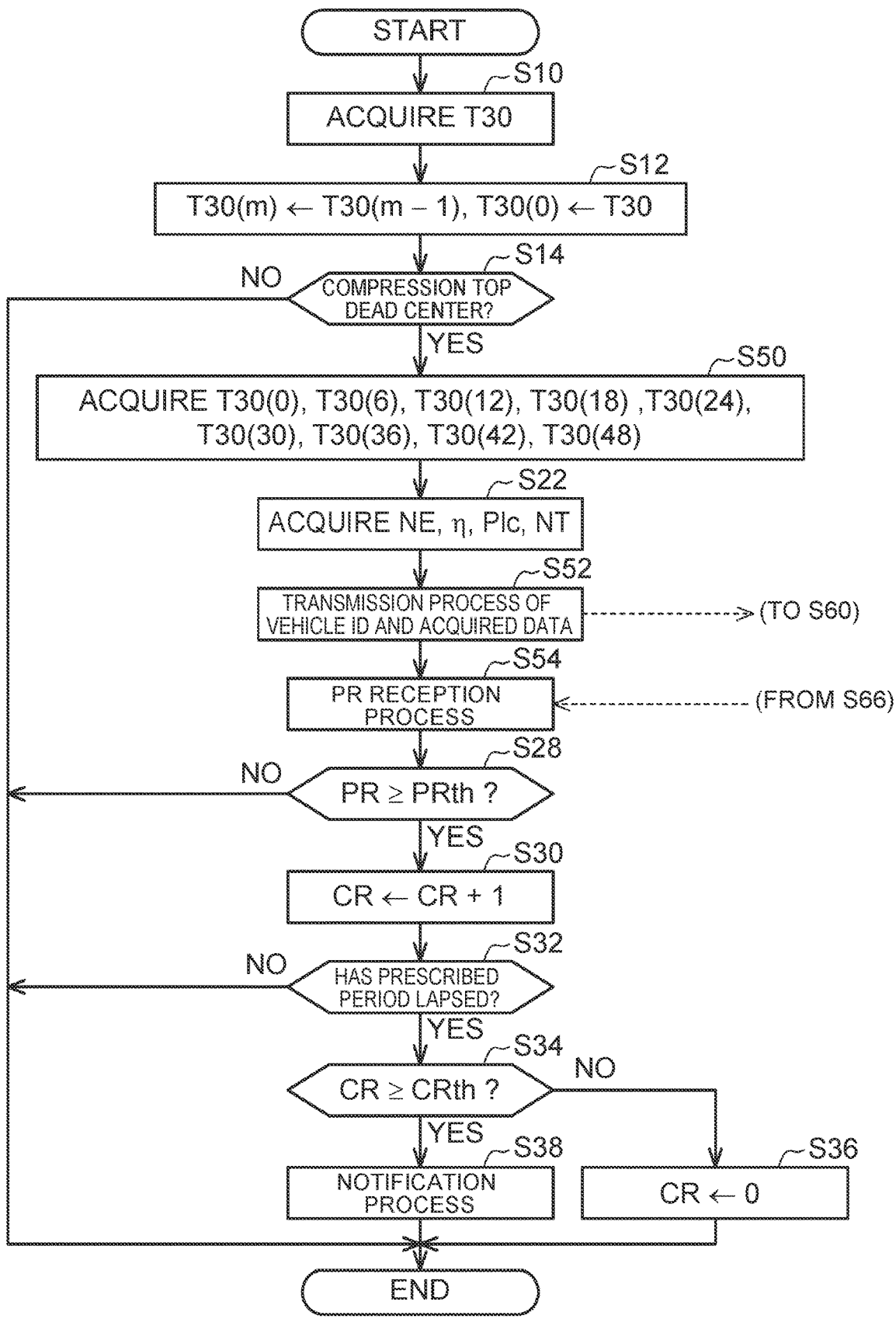
FIG. 6 is a flowchart of a vehicle-side process in the state detection system.
Figure 7:
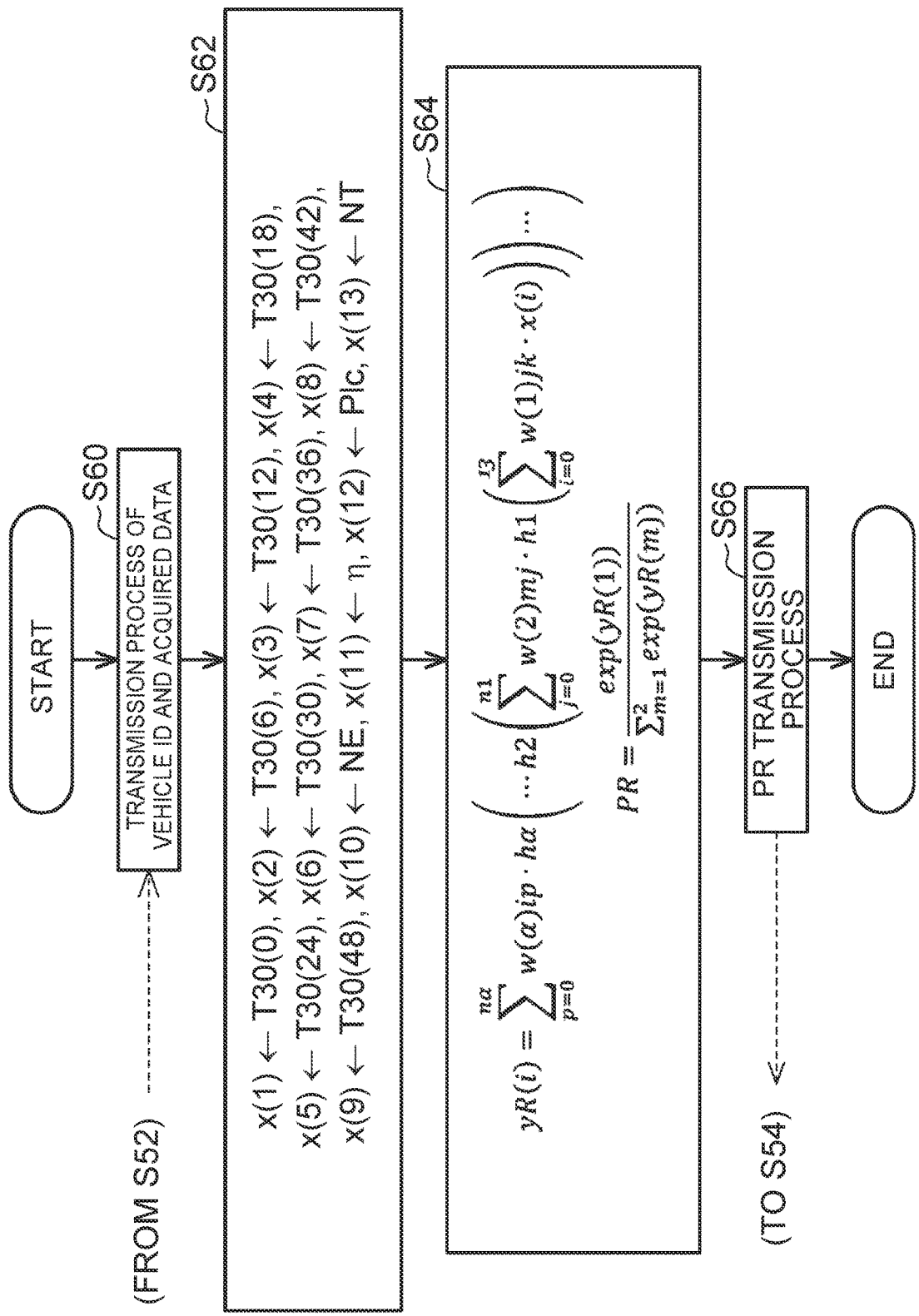
FIG. 7 is a flowchart of a center-side process in the state detection system.

FIGS. 6 and 7 show the procedures of the processes relating to a misfire detection according to the present embodiment. The process shown in FIG. 6 is implemented when the CPU 62 executes a misfire subprogram 64b stored in the ROM 64 shown in FIG. 5. The process shown in FIG. 7 is implemented when the CPU 92 executes a misfire main program 94a stored in the ROM 94. The processes in FIGS. 6 and 7 corresponding to the process shown in FIG. 2 are designated by the same step numbers for convenience. Hereinafter, based on the time series of the misfire detection process, the processes shown in FIGS. 6 and 7 will be described.

Specifically, in the vehicle VC, when positive determination is made in the process of S14 shown in FIG. 6, the CPU 62 acquires minute rotation time T30(0), T30(6), T30(12), T30(18), T30(24), T30(30), T30(36), T30(42), T30(48) (S50). These values of the minute rotation time T30 constitute a rotation waveform variable that is a variable including the information regarding a difference between the values of the minute rotation time T30 at angular intervals different from each other. Particularly, the minute rotation time T30 is a period of time taken for rotation at an angular interval from 30° CA before a compression top dead center to the compression top dead center. The minute rotation time T30 is a value corresponding to nine appearing timings of the compression top dead center. Accordingly, group data of the minute rotation time T30 constitutes a variable indicating the information regarding a difference between the values of the minute rotation time T30 corresponding to the compression top dead center different from each other. All of these nine values of the minute rotation time T30 are used in calculation of the inter-cylinder ΔTb(2), and the fluctuation pattern variables FL[02], FL[12], FL[32].

Next, after executing the process of S22, the CPU 62 operates the communication device 69 to transmit the data acquired in the processes of S50, S22 to the center 90 together with identification information regarding the vehicle VC (S52). In the following description, the identification information regarding the vehicle VC is stated as a vehicle ID.

In response, the CPU 92 of the center 90 receives the transmitted data as shown in FIG. 7 (S60). The CPU 92 then substitutes the values of the variables acquired in the process of S60 to input variables x(1) to x(13) (S62). Specifically, the CPU 92 substitutes the values of the minute rotation time T30(0), T30(6), T30(12), T30(18), T30(24), T30(30), T30(36), T30(42), T30(48) into the input variables x(1) to x(9), respectively. The CPU 92 also substitutes the value of the rotation speed NE into the input variable x(10), the value of the charging efficiency η into the input variable x(11), the value of the lock-up hydraulic pressure Plc into the input variable x(12), and the value of the input shaft rotation speed NT into the input variable x(13).

Next, the CPU 92 inputs the input variables x(1) to x(13) into a detection mapping that is defined by the mapping data 96a stored in the memory 96 shown in FIG. 5 so as to calculate the value of the combustion state variable PR that is an output value of the detection mapping (S64).

In the present embodiment, the detection mapping is constituted of a neural network having "α" intermediate layers and an output layer. The intermediate layers each have activation functions h1 to hα that are ReLU. The output layer has an activation function that is a softmax function. For example, in a first intermediate layer, the values of nodes are generated by inputting the input variables x(1) to x(13) into a linear mapping defined by a coefficient w(1)ji (j=0 to n1 and i=0 to 13) and inputting an obtained output into the activation function h1. Specifically, on the assumption that m=1, 2, . . . , α, the values of nodes in m-th intermediate layer are generated by inputting an output of a linear mapping defined by a coefficient w(m) into an activation function hm. In FIG. 7, n1, n2, . . . , nα are the number of nodes in each of the first, second, . . . , α-th intermediate layers, respectively. Incidentally, the coefficient w(1)j0 or the like is a bias parameter, and the input variable x(0) is defined as "1".

Next, the CPU 92 operates the communication device 99 to transmit a signal indicating the value of the combustion state variable PR to the vehicle VC to which the data received in the process of S60 was transmitted (S66), and temporarily terminates a series of the processes shown in FIG. 7. In response to this, as shown in FIG. 6, the CPU 62 receives the value of the combustion state variable PR (S54), and executes the processes of S28 to S38.

Thus, in the present embodiment, since the process in S64 is executed in the center 90, the arithmetic load of the CPU 62 can be reduced.

Fourth Embodiment

Hereinafter, a fourth embodiment will be described with the attention mainly given to the differences from the aforementioned embodiments with reference to the drawings.

The state detection system in each of the aforementioned embodiments is configured as a system that detects the state where a misfire occurs in the internal combustion engine 10, based on the rotation fluctuation of the crankshaft 24. In the case where the air-fuel ratio varies between the cylinders, and therefore air-fuel ratio imbalance between the cylinders occurs, the combustion states of the cylinders also vary, which causes increased rotation fluctuation of the crankshaft 24. The state detection system of the present embodiment is configured as a system that detects such an air-fuel ratio imbalance between the cylinders. The configuration of the state detection system of the present embodiment is basically the same as the configuration shown in FIG. 1. However, the ROM 64 in the state detection system of the present embodiment stores a program for detecting the air-fuel ratio imbalance between cylinders instead of the misfire program 64a shown in FIG. 1.

Figure 8:
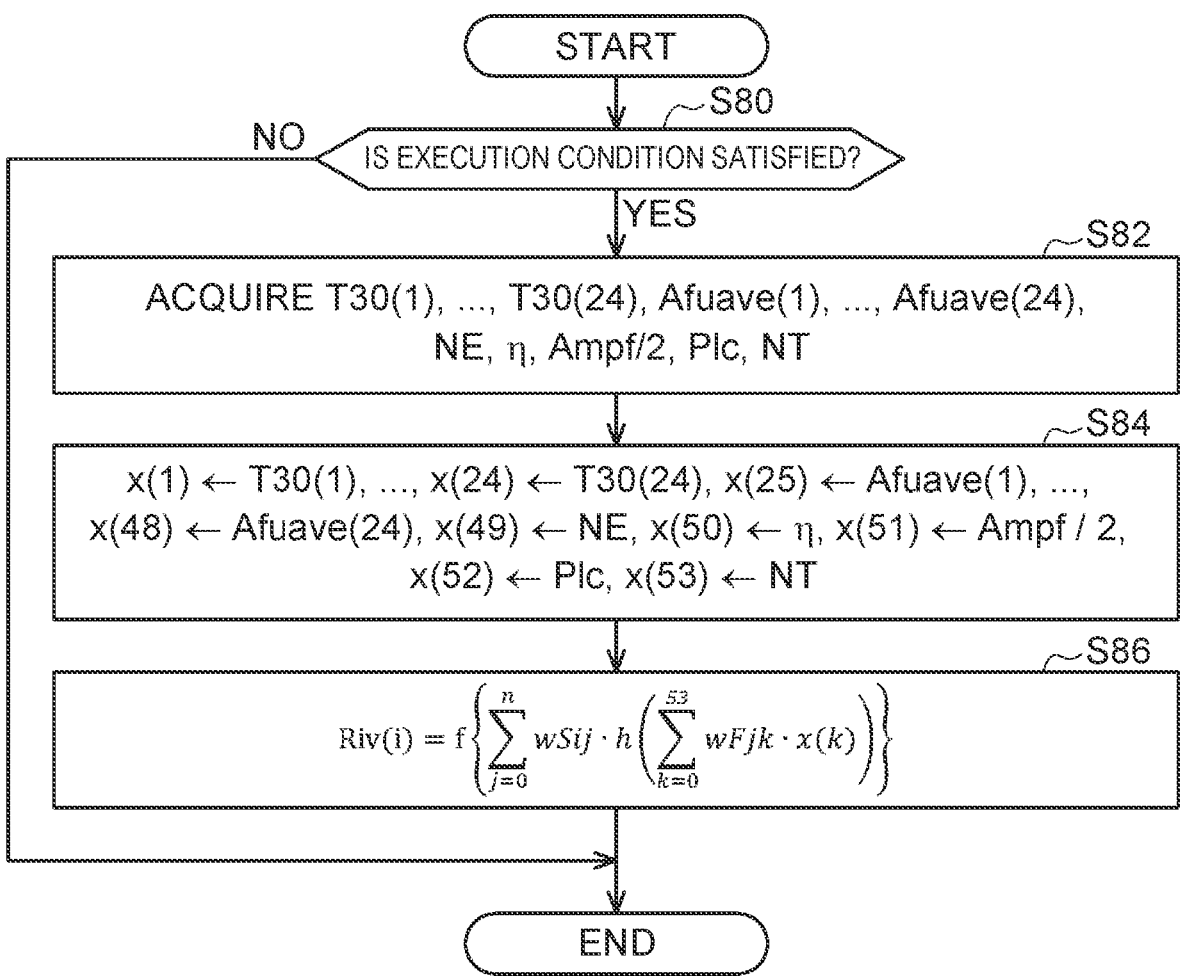
FIG. 8 is a flowchart of a process defined as a detection program executed by the controller provided in the state detection system according to a fourth embodiment.

FIG. 8 shows the procedures of the process regarding detection of the air-fuel ratio imbalance between the cylinders. The process shown in FIG. 8 is implemented when the CPU 62 repeatedly executes the detection program stored in the ROM 64 in every predetermined control cycle.

In a series of the processes shown in FIG. 8, the CPU 62 first determines whether or not an execution condition of the imbalance detection process is established (S80). The execution condition includes that purging of fuel vapor or recycling of exhaust gas with respect to intake air of the internal combustion engine 10 is not conducted.

Next, the CPU 62 acquires values of the minute rotation time T30(1), T30 (2), . . . , T30(24), upstream-side averages Afuave(1), Afuave(2), . . . , Afuave(24), rotation speed NE, charging efficiency η, 0.5-order amplitude Ampf/2, and lock-up hydraulic pressure Plc, and input shaft rotation speed NT (S82). When m=1 to 24, the upstream-side average Afuave (m) is an average of the upstream-side detection values Afu at an angular interval of 30° CA that is the same as each of the minute rotation time T30(m). The 0.5-order amplitude Ampf/2 is the intensity of a 0.5-order component of the rotational frequency of the crankshaft 24. The CPU 62 calculates the 0.5-order amplitude Ampf/2 by Fourier transform of the time series data of the minute rotation time T30.

Next, the CPU 62 substitutes the values acquired in the process of S12 into input variables x(1) to x(53) of a detection mapping that outputs an imbalance rate Riv (S84). More specifically, on the assumption that "m=1 to 24", the CPU 62 substitutes the value of the minute rotation time T30(m) into an input variable x(m), the value of the upstream-side average Afuave(m) into the input variable x(24+m), the value of the rotation speed NE into the input variable x(49), the value of the charging efficiency into the input variable x(50), and the value of 0.5-order amplitude Ampf/2 into the input variable x(51). The CPU 62 also substitutes the value of the lock-up hydraulic pressure Plc into the input variable x(52), and the value of the input shaft rotation speed NT into the input variable x(53), respectively.

In the present embodiment, the imbalance rate Riv is "0" in the cylinder in which fuel of a target injection amount is injected. The imbalance rate Riv is a positive value when an actual injection amount is larger than the target injection amount, whereas the imbalance rate Riv is a negative value when the actual injection amount is smaller than the target injection amount.

Next, the CPU 62 inputs the input variables x(1) to x(53) into the detection mapping defined by the mapping data 66a stored in the memory 66 shown in FIG. 1 so as to calculate each of the imbalance rates Riv(1) to Riv(4) of the cylinder #i (i=1 to 4) (S86).

In the present embodiment, the detection mapping is constituted of a neural network having one intermediate layer. The neural network includes an activation function h(x) as an input-side nonlinear mapping that performs nonlinear conversion of the outputs of an input-side coefficient wFjk (j=0 to n, k=0 to 53) and an input-side linear mapping that is a linear mapping defined by the input-side coefficient wFjk. In the present embodiment, a hyperbolic tangent "tanh(x)" is illustrated as the activation function h(x). The neural network includes the activation function f(x) as an output-side nonlinear mapping that performs nonlinear conversion of the outputs of an output-side coefficient wSij (i=1 to 4, j=0 to n) and an output-side linear mapping that is a linear mapping defined by the output-side coefficient wSij. In the present embodiment, the hyperbolic tangent "tanh(x)" is illustrated as the activation function f(x). The value n represents the dimension of the intermediate layer.

Figure 9:
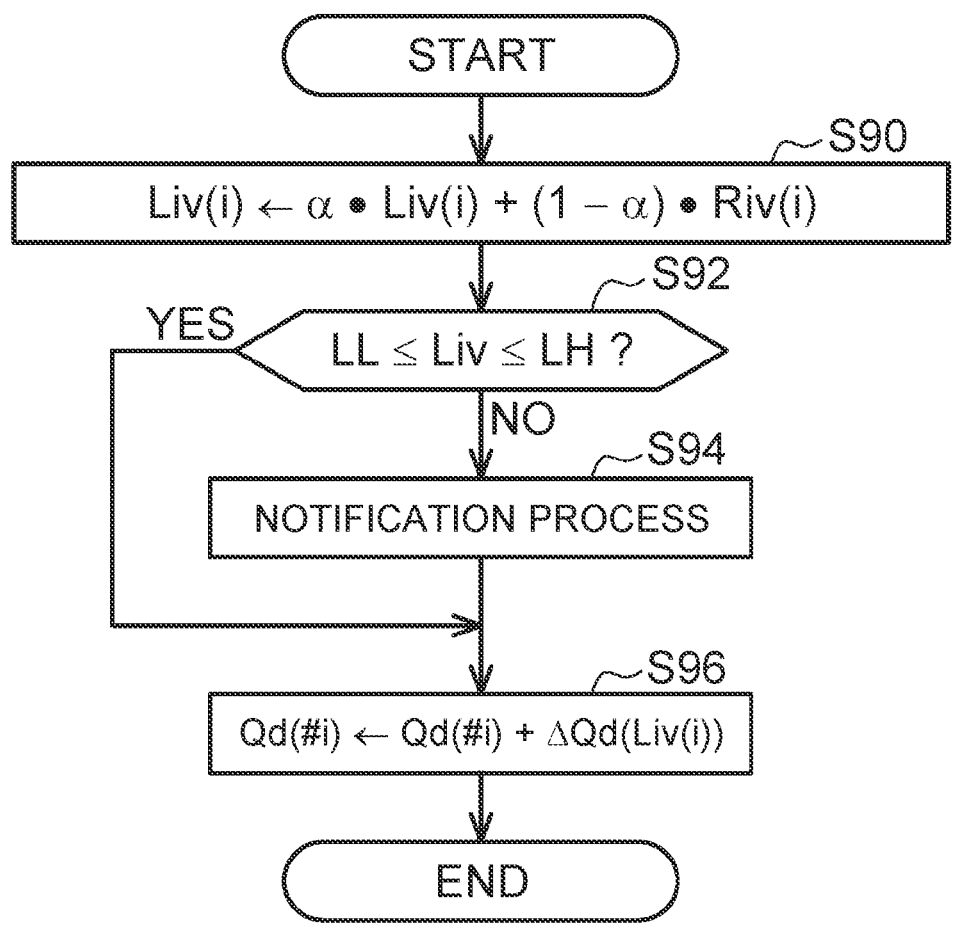
FIG. 9 is a flowchart of a process defined as a handling program that is executed by the controller.

When the process of S86 is completed, or when negative determination is made in the process of S80, the CPU 62 temporarily terminates a series of the processes shown in FIG. 8. FIG. 9 shows the procedures of the process using the imbalance rate Riv(i). The process shown in FIG. 9 is implemented, when the CPU 62 repeatedly executes the handling program stored in the ROM 64 shown in FIG. 1 whenever the imbalance rate Riv(i) is calculated, for example.

In a series of the processes shown in FIG. 9, the CPU 62 first updates the imbalance learning value Liv(i) by an index moving average process that takes, as an input, the value of the imbalance rate Riv(i) that is newly calculated in the process of FIG. 8 (S90). Specifically, the CPU 62 updates the imbalance learning value Liv with the sum of a value obtained by multiplying a coefficient a by the imbalance learning value Liv(i) stored in the memory 66 and a value obtained by multiplying "1-α" by the imbalance rate Riv(i) (S90). Note that "0<α<1."

Next, the CPU 62 determines whether or not the imbalance learning value Liv(i) is equal to or more than a lean-side tolerance limit LL and is equal to or less than a rich-side tolerance limit LH (S92). When determining that the imbalance learning value Liv(i) is less than the lean-side tolerance limit LL, or is larger than the rich-side tolerance limit LH (S92: NO), the CPU 62 operates an alarm lamp 78 to execute the notification process in order to encourage a user to make repairs (S94).

Meanwhile, when determining that the imbalance learning value Liv(i) is more than the lean-side tolerance limit LL, and is equal to or less than the rich-side tolerance limit LH (S92: YES), or when the process of S94 is completed, the CPU 62 corrects a request injection amount Qd (#i) of each cylinder (S96). Specifically, the CPU 62 corrects the request injection amount Qd (#i) by adding a correction amount ΔQd (Liv(i)) corresponding to the imbalance learning value Liv(i) to the request injection amount Qd (#i) of each cylinder. Here, when the imbalance learning value Liv(i) is larger than zero, the correction amount ΔQd (Liv(i)) is a negative value, whereas when the imbalance learning value Liv(i) is smaller than zero, the correction amount ΔQd (Liv(i)) is a positive value. When the imbalance learning value Liv(i) is zero, the correction amount ΔQd (Liv(i)) becomes zero either.

The CPU 62 temporarily terminates a series of the processes shown in FIG. 9, when the process of S96 is completed. In the present embodiment, when positive determination is made in the process of S80, and then the process of S82 is executed, the process of S96 is temporarily stopped.

Incidentally, the mapping data 66a in the present embodiment is generated as shown below, for example. First, based on measurement performed in advance using a single unit, a plurality of fuel injection valves 20 that present various values other than zero as the imbalance rate Riv, and three fuel injection valves 20 that present zero as the imbalance rate are prepared. Then, an internal combustion engine 10, coupled with a torque converter 40 and mounted with three fuel injection valves 20 that present zero as the imbalance rate and one fuel injection valve 20 that presents the imbalance rate other than zero, is operated in a test bench with the output shaft of the torque converter 40 being connected to a dynamometer. The imbalance rates Rivt of the mounted fuel injection valves 20 are each used as teacher data.

With use of the rotation waveform variable acquired each time and the value acquired in the process of S82, the value of the imbalance rate Rivt is calculated by the same processes as in S84, S86. The values of the input-side coefficient wFjk and the output-side coefficient wSij are learned, so as to reduce a difference between the thus-learned imbalance rate Rivt and the teacher data. Specifically, the values of the input-side coefficient wFjk and the output-side coefficient wSij may be learned so as to minimize cross entropy, for example. The rotation speed of the transmission input shaft 45 can be imitated with the rotation speed of the dynamometer.

In the present embodiment, the lock-up hydraulic pressure Plc and the input shaft rotation speed NT are included in the input of the detection mapping. Accordingly, the imbalance rate Rivt can be calculated as a value reflecting the influence that the drive system of the vehicle VC exerts on the rotation behavior of the crankshaft 24. Therefore, it is possible to enhance the detection accuracy of the air-fuel ratio imbalance between cylinders in the internal combustion engine 10 mounted on the vehicle VC.

Correspondence Relation

The memory corresponds to the memory 66. The rotation waveform variable corresponds to the inter-cylinder variable ΔTb(2), the fluctuation pattern variables FL[02], FL[12], FL[32]. The first processor corresponds to the CPU 62 and the ROM 64. The second processor corresponds to the CPU 92 and the ROM 94. The acquisition process corresponds to the processes of S50, S22, S22', S82, and the vehicle-side reception process corresponds to the process of S54, respectively. The outer-side reception process corresponds to the process of S60, the output value calculation process corresponds to the processes of S62, S64, S86, the outer-side transmission process corresponds to the process of S66, and the determination process corresponds to the processes of S28, S30, S34, S92, respectively. The data analysis device corresponds to the center 90. The rotation speed of the drive system rotating element that is a rotating element disposed in the power transmission line between the internal combustion engine 10 and the driving wheels 50 corresponds to the input shaft rotation speed NT. The drive system rotating element corresponds to the transmission input shaft 45. In the first, third, and fourth embodiments, the input shaft rotation speed NT corresponds to the drive system rotation speed variable.

In the first, second, and third embodiments, the state where a misfire has occurred corresponds to the predetermined operating state. In the fourth embodiment, the state where an air-fuel ratio varies between the cylinders corresponds to the predetermined operating state. Furthermore, in the fourth embodiment, the imbalance rate Rivt corresponds to the combustion state variable.

Other Embodiments

The present embodiment can be implemented with modifications as shown below. The present embodiment and following modifications may be implemented in combination with each other without departing from the range of technically consistency.

Inter-Cylinder Variable

The inter-cylinder variable ΔTb is not limited to a difference between values of the minute rotation time T30 corresponding to the compression top dead centers of a pair of cylinders that are adjacent in appearing timing of the compression top dead center to each other, the difference being a difference between the values separated by 720° CA. For example, the inter-cylinder variable ΔTb may be a difference between values of minute rotation time T30 corresponding to the compression top dead centers of the cylinders having the appearance timing of the compression top dead center being separated by 360° CA from each other, the difference being a difference of the values separated by 720° CA. In this case, the inter-cylinder ΔTb(2) is equal to "T30(12)-T30(24)-{T30(36)-T30(48)}".

The inter-cylinder variable ΔTb is not limited to the difference between values of the minute rotation time T30 corresponding to the compression top dead centers of a pair of cylinders, the values being a difference of the values separated by 720° CA. The inter-cylinder variable ΔTb may be a difference between values of the minute rotation time T30 corresponding to the compression top dead centers of a cylinder as a misfire detection target and a cylinder other than the cylinder as the misfire detection target.

For example, the inter-cylinder variable may be a ratio between values of the minute rotation time T30 corresponding to the compression top dead centers of a pair of cylinders. The minute rotation time used for defining the inter-cylinder variable ΔTb is not limited to the time taken for rotation of 30° CA. For example, the minute rotation time may be the time taken for rotation of 45° CA, or the like. In that case, it is desirable that the minute rotation time is the time taken for rotation at an angular interval equal to or less than the interval of appearance of the compression top dead center.

Furthermore, in the above configuration, an instant rotation speed, obtained by dividing a prescribed angular interval by the time taken for rotation at the prescribed angular interval, may be used instead of the minute rotation time.

Fluctuation Pattern Variable

Definition of the fluctuation pattern variable is not limited to the definition illustrated in the embodiments disclosed. For example, the definition of the fluctuation pattern variable may be changed by changing the inter-cylinder variable ΔTb to the variable illustrated in the column "Inter-Cylinder Variable" or other variables.

Furthermore, it is not essential to define the fluctuation pattern variable as a ratio between values of the inter-cylinder variable ΔTb corresponding to the appearance timings of the compression top dead center that are different from each other. The fluctuation pattern variable may be a difference instead of the ratio. In this case, including the operating point variable of the internal combustion engine 10 in an input also makes it possible to calculate the value of the combustion state variable PR that reflects that the size of the fluctuation pattern variable changes in accordance with the operating point.

Drive System Rotation Speed Variable

A mapping including, as an input variable, a variable indicating the series data of the input shaft rotation speed NT as in the second embodiment may be used as the detection mapping in the third embodiment and the fourth embodiment. Moreover, the input shaft rotation speed NT may be replaced with the rotation speed of a drive system rotating element, other than the transmission input shaft 45 disposed in the power transmission line between the internal combustion engine 10 and the driving wheels 50, such as the output shaft speed Nout that is the rotation speed of the transmission output shaft 46, and the wheel speed V that is the rotation speed of the driving wheels 50. The transmission mode of torque among the transmission input shaft 45, the driving wheels 50 and the crankshaft 24 changes in accordance with gear ratio setting of the change gear 44 that is interposed therebetween. Accordingly, when the variable, indicating the information on the rotation speed of the drive system rotating element configured such that the change gear 44 is interposed between the drive system rotating element and the crankshaft 24, is included in the input variables of the detection mapping, it is desirable that the information relating to the gear ratio of the change gear 44 is also included in the input variables of the detection mapping.

Lock-up Hydraulic Pressure

In the embodiments disclosed, the lock-up hydraulic pressure Plc is acquired from the output of the oil pressure sensor 73 provided in the hydraulic circuit 48. However, the lock-up hydraulic pressure Plc may be acquired from an operation signal MS4 of the hydraulic circuit 48. In such a case, the oil pressure sensor 73 may be omitted.

In the embodiments disclosed, the lock-up hydraulic pressure Plc is included in the input variables of the detection mapping. Instead of the lock-up hydraulic pressure Plc, other variables indicating the operating state of the lock-up clutch 42 may be included in the input variables of the detection mapping. For example, when the operating state of the lock-up clutch 42 can be switched between an engaged state and a disengaged state in a binary manner, a variable indicating in which state the lock-up clutch 42 is can be used as a variable alternative to the lock-up hydraulic pressure Plc. Incidentally, in the case of a vehicle without the lock-up clutch 42, it is naturally understood that the variable indicating the operating state of the lock-up clutch 42 is not included in the input variables of the detection mapping.

Rotation Waveform Variable

In the process of S26, the inter-cylinder variable ΔTb(2), and the fluctuation pattern variables FL[02], FL[12], FL[32] constitute the rotation waveform variable. However, the rotation waveform variable is not limited to this configuration. For example, the fluctuation pattern variables that constitute the rotation waveform variable may be any one or two of the fluctuation pattern variables FL[02], FL[12], FL[32]. The fluctuation pattern variables may also include four or more fluctuation pattern variables, such as the fluctuation pattern variables FL[02], FL[12], FL[32], FL[42].

In the process of S64, the values of the minute rotation time T30 corresponding to each of the nine timings that are different in appearance timing of the compression top dead center from each other constitute the rotation waveform variable. However, the rotation waveform variable is not limited to this configuration. For example, with use of the compression top dead center of the cylinder to be a target of misfire detection as a center, a section twice or above the angular interval where the compression top dead center appears is divided into subsections at intervals of 30° CA, and the value of the minute rotation time T30 in each of the subsections may constitute the rotation waveform variable. In the above configuration, it is not essential to use the compression top dead center of the cylinder to be a misfire detection target as a center. Furthermore, the minute rotation time is not limited to the time taken for rotation at intervals of 30° CA. Instead of the minute rotation time, an instant rotation speed, obtained by dividing a prescribed angular interval by the time taken for rotation at the prescribed angular interval, may be used.

Operating Point Variable

The operating point variable is not limit to the rotation speed NE and the charging efficiency η. For example, the operating point variable may be an intake air amount Ga and the rotation speed NE. When a compression ignition type internal combustion engine is used as stated in the column of "Internal Combustion Engine" below, the operating point variable may be an injection amount and the rotation speed NE. It is not essential to use the operating point variable as an input of the detection mapping. For example, in such a case where the internal combustion engine is driven exclusively in a specific operating point when the system is applied to an internal combustion engine mounted on a series hybrid vehicle described in the column of "Vehicle" below, the value of the combustion state variable PR can be calculated with high accuracy without the operating point variable being included in the input variables.

Outer-Side Transmission Process

In the process of S66, the value of the combustion state variable PR is transmitted. However, the value to be transmitted is not limited to the combustion state variable PR. For example, the values of the prototype variables yR(1), yR(2) used as an input of the softmax function serving as an output activation function may be transmitted. For example, the center 90 may execute the processes of S28 to S36, and transmit the determination result regarding whether or not there is any abnormality.

Handling Process

In the embodiments disclosed, the alarm lamp 78 is operated to notify the occurrence of a misfire through visual information. However, the notification method is not limited to this. For example, a speaker may be operated to notify the occurrence of a misfire through auditory information. For example, the controller 60 shown in FIG. 1 may include the communication device 69, and a process of transmitting to a user's mobile terminal a signal indicating the occurrence of a misfire through operation of the communication device 69 may be provided. The process can be implemented by installing on the user's mobile terminal an application program for executing the notification.

The handling process is not limited to the notification process. For example, the handling process may be an operation process that is to operate an operation unit, configured to control combustion of air-fuel mixture in the combustion chambers 18 of the internal combustion engine 10, in accordance with the information indicating the occurrence of a misfire. Specifically, for example, each of the ignition devices 22 may be used as the operation unit, and the operation unit of the cylinder, in which the misfire occurred, may advance the ignition timing. For example, each of the fuel injection valves 20 may be used as the operation unit, and the operation unit of the cylinder, in which the misfire occurred, may increase the fuel injection amount.

Input into Detection Mapping

An input such as an input into the neural network and an input into a regression described in the column of "Algorithm of Machine Learning" below is not limited to an input constituted of physical values or fluctuation pattern variables FL which are single in each dimension. For example, some of a plurality of types of physical values or fluctuation pattern variables FL, used as an input into the detection mapping in the above embodiments and the like, may be subjected to analysis of principal components, instead of being used as a direct input into the neural network or the regression, and some of the principal components thereof may be used as a direct input into the neural network or the regression. However, when the principal components are used as an input into the neural network or the regression, it is not essential that the principal components are used as only a portion of the input into the neural network of the regression. Rather, the entire input may be made up of the principal components. When the principal components are used as an input into the detection mapping, the mapping data 66a, 96a include data for defining a detection mapping that defines the principal components.

Mapping Data

The mapping data that defines mappings used for calculation executed in the vehicle may be defined as the data that defines the mapping illustrated in the process of S64.

For example, according to the description in FIG. 7, the neural network has two or more intermediate layers. However, the number of the intermediate layers is not limited to this. In the embodiments disclosed, the activation functions h, h1, h2, . . . hα are set to ReLU, and the output activation function is set to the softmax function. However, the activation functions are not limited to this. For example, the activation functions h, h1, h2, . . . hα may be hyperbolic tangent functions. For example, the activation functions h, h1, h2, . . . hα may be logistic sigmoid functions.

For example, the output activation functions may be logistic sigmoid functions. In this case, for example, an output layer may have one node, and an output variable may be the combustion state variable PR. If that is the case, the presence or absence of abnormality can be determined such that when the value of the output variable is equal to or greater than a prescribed value, abnormality is determined.

Algorithm of Machine Learning

The algorithm of machine learning is not limited to those using the neural network. For example, a regression may also be used. The regression corresponds to the neural network without any intermediate layer. A support vector machine may also be used, for example. In this case, there is no meaning in the size of the value of an output itself. Whether a misfire occurred or not is expressed based on whether the value is positive or not. In other words, the combustion state variable has a value of three or more, and the size of these values do not express the magnitude of the probability of a misfire.

Learning Step

Learning is executed in the situation where a misfire occurs at random in the embodiments disclosed. However, learning is not necessarily executed in this situation. For example, learning may be executed in the situation where a misfire continuously occurs in a specific cylinder. However, in that case, it is desirable that the inter-cylinder variable used as an input into the mapping or the inter-cylinder variable ΔTb used for fluctuation pattern variable is a different, or the like, between the values of the minute rotation time T30 corresponding to the compression top dead centers of a cylinder to be a misfire detection target and a cylinder other than the target cylinder, as stated in the column of "Inter-Cylinder Variable".

Learning is not limited to the learning based on the rotation behavior of the crankshaft 24 when the internal combustion engine 10 is operated, with the crankshaft 24 being connected to a dynamometer. For example, learning may be performed based on the rotation behavior of the crankshaft 24 when the internal combustion engine 10 is mounted on a vehicle, and the vehicle is made to travel. With this configuration, the influence that the state of the road surface, on which the vehicle travels, exerts on the rotation behavior of the crankshaft 24 can be reflected on learning.

Data Analysis Device

For example, instead of the processes of S62, S64, the processes of S24, S26, or the like, may be executed in the center 90.

The process of FIG. 7 may be executed, for example, with the mobile terminal possessed by a user. This can be achieved by installing on the mobile terminal an application program for executing the process of FIG. 7. In this case, the process of transmitting and receiving the vehicle ID may be deleted by setting such that an effective distance of data transmission in the process of S52 is about the length of the vehicle, for example.

Processor

The processor is not limited to those including the CPU 62(92) and ROM 64(94) and configured to execute software processing. For example, the system may include a dedicated hardware circuit (for example, an ASIC, etc.) for hardware processing of at least some of the processes that are processed by software in the embodiments disclosed. Specifically, the processor may have any one of the configurations (a) to (c): (a) including a processing device that executes all the processes based on programs, and a program storage device such as a ROM that stores the programs; (b) including a processing device that executes some of the processes based on programs, a program storage device, and a dedicated hardware circuit that executes the remaining processes; and (c) including a dedicated hardware circuit that executes all the processes. Here, the number of the software processors including a processing device and a program storage device, or the number of the dedicated hardware circuits may be two or more.

Memory

In the embodiments disclosed, the memory that stores the mapping data 66a, 96a, and the memory (ROMs 64, 94) that stores the misfire program 64a and the misfire main program 94a are provided as separate units. However, the memory may have other configurations.

Computer

The computer is not limited to those constituted of a processor such as the CPU 62 and the ROM 64 mounted on a vehicle, and a processor such as the CPU 92 and the ROM 94 included in the center 90. For example, the computer may be constituted of a processor mounted on a vehicle, a processor included in the center 90, and a processor such as a CPU and a ROM in a user's mobile terminal. This configuration can be achieved by, for example, setting the process of S66 in FIG. 7 as a process of transmitting to the user's mobile terminal, and setting the processes of S54, S28 to S36 to be executed in the mobile terminal.

Predetermined Operating State

The operating states of the internal combustion engine 10 other than the misfire or the air-fuel ratio imbalance between cylinders may also be used as a detection target of the state detection system, as long as the operating states involve variation in combustion state between cylinders. For example, when so-called compression insufficiency, that is, compression of intake air in the cylinder becoming insufficient due to the intake valve or the exhaust valve being opened and fixed, occurs in a specific cylinder, the combustion state varies between the cylinders, which causes increased rotation fluctuation of the crankshaft 24. Accordingly, detecting such compression insufficiency with use of the detection mapping that takes the aforementioned rotation waveform variable and the drive system rotation speed variable as an input makes it possible to detect the compression insufficiency with high accuracy by taking the influence that the drive states of the motor-generators exert on the rotation behavior of the crankshaft 24 into account.

Internal Combustion Engine

In the embodiments disclosed, the cylinder injection valves that inject fuel into the combustion chambers 18 are illustrated as the fuel injection valves. However, the fuel injection valves are not limited to the cylinder injection valves. For example, the fuel injection valves may be port injection valves that inject fuel into the intake passage 12. Moreover, the internal combustion engine may have both the port injection valves and the cylinder injection valves, for example.

The internal combustion engine is not limited to the spark ignition type internal combustion engine. For example, other internal combustion engines such as a compression ignition type internal combustion engine that uses light oil as fuel may also be used.

Vehicle

Although the vehicle VC in the embodiments disclosed is configured such that the drive system includes the lock-up clutch 42, the torque converter 40, and the change gear 44, the drive system may have a different configuration.

What is claimed is:

1. A state detection system for an internal combustion engine, the state detection system being applied to the internal combustion engine mounted on a vehicle, the state detection system being configured to detect a predetermined operating state of the internal combustion engine, the predetermined operating state involving a variation in a combustion state between cylinders, the state detection system comprising:

a memory configured to store mapping data, the mapping data being data that defines a detection mapping, the detection mapping being a mapping between an input and an output, the input being a rotation waveform variable and a drive system rotation speed variable and the output being a value of a combustion state variable, and the detection mapping including a joint operation of the rotation waveform variable and the drive system rotation speed variable based on a parameter learned by machine learning, the rotation waveform variable being a variable including information on a difference in rotation speed of a crankshaft between the cylinders of the internal combustion engine during a period when combustion torque is generated in each of the cylinders, the drive system rotation speed variable being a variable indicating information on a rotation speed of a drive system rotating element that is a rotating element disposed in a power transmission line between the internal combustion engine and driving wheels, the combustion state variable being a variable relating to a variation degree in combustion state between the cylinders; and a processor configured to execute an acquisition process and a determination process, the acquisition process being configured to acquire a value of the rotation waveform variable based on an output of a sensor that detects rotation behavior of the crankshaft and to acquire a value of the drive system rotation speed variable based on an output of a sensor that detects rotation behavior of the drive system rotating element, the determination process being configured to determine whether or not the internal combustion engine is in the predetermined operating state, based on an output value of the detection mapping that takes the value of the rotation waveform variable and the value of the drive system rotation speed variable acquired in the acquisition process as an input.

2. The state detection system according to claim 1, wherein the predetermined operating state is a state where a misfire has occurred.

3. The state detection system according to claim 1, wherein the predetermined operating state is a state where an air-fuel ratio varies between the cylinders.

4. The state detection system according to claim 1, wherein the drive system rotating element is a transmission input shaft.

5. The state detection system according to claim 1, wherein the drive system rotation speed variable is a variable indicating time series data of the rotation speed of the drive system rotating element.

6. The state detection system according to claim 1, wherein when it is determined by the determination process that the internal combustion engine is in the predetermined operating state, the processor is configured to operate prescribed hardware to execute a handling process for handling the predetermined operating state.

7. The state detection system according to claim 1, wherein:
the determination process includes an output value calculation process for calculating an output value of the detection mapping that takes the value of the rotation waveform variable and the value of the drive system rotation speed variable acquired in the acquisition process as an input;
the processor includes a first processor mounted on the vehicle, and a second processor disposed outside the vehicle;
the first processor is configured to execute the acquisition process and a vehicle-side reception process for receiving a signal based on a calculation result of the output value calculation process; and
the second processor is configured to execute the output value calculation process and an outer-side transmission process for transmitting to the vehicle a signal based on the calculation result of the output value calculation process.

8. The state detection system according to claim 7, further comprising a data analysis device, wherein
the second processor and the memory are constituent elements of the data analysis device.

9. The state detection system according to claim 7, further comprising the vehicle.

10. A data analysis device for an internal combustion engine, the data analysis device being configured to detect a predetermined operating state of an internal combustion engine, the predetermined operating state involving a variation in a combustion state between cylinders, the data analysis device comprising:
a memory configured to store mapping data, the mapping data being data that defines a detection mapping, the detection mapping being a mapping between an input and an output, the input being a rotation waveform variable and a drive system rotation speed variable and the output being a value of a combustion state variable, and the detection mapping including a joint operation of the rotation waveform variable and the drive system rotation speed variable based on a parameter learned by machine learning, the rotation waveform variable being a variable including information on a difference in rotation speed of a crankshaft between the cylinders of the internal combustion engine during a period when combustion torque is generated in each of the cylinders, the drive system rotation speed variable being a variable indicating information on a rotation speed of a drive system rotating element that is a rotating element disposed in a power transmission line between the internal combustion engine and driving wheels, the combustion state variable being a variable relating to a variation degree in combustion state between the cylinders; and a processor configured to execute an acquisition process and a determination process, the acquisition process being configured to acquire a value of the rotation waveform variable based on an output of a sensor that detects rotation behavior of the crankshaft and to acquire a value of the drive system rotation speed variable based on an output of a sensor that detects rotation behavior of the drive system rotating element, the determination process being configured to determine whether or not the internal combustion engine is in the predetermined operating state, based on an output value of the detection mapping that takes the value of the rotation waveform variable and the value of the drive system rotation speed variable acquired in the acquisition process as an input.

11. A vehicle comprising:
an internal combustion engine; and pg,41
a state detection system configured to detect a predetermined operating state of the internal combustion engine, the predetermined operating state involving a variation in a combustion state between cylinders, the state detection system including:
a memory configured to store mapping data, the mapping data being data that defines a detection mapping, the detection mapping being a mapping between an input and an output, the input being a rotation waveform variable and a drive system rotation speed variable and the output being a value of a combustion state variable, and the detection mapping including a joint operation of the rotation waveform variable and the drive system rotation speed variable based on a parameter learned by machine learning, the rotation waveform variable being a variable including information on a difference in rotation speed of a crankshaft between the cylinders of the internal combustion engine during a period when combustion torque is generated in each of the cylinders, the drive system rotation speed variable being a variable indicating information on a rotation speed of a drive system rotating element that is a rotating element disposed in a power transmission line between the internal combustion engine and driving wheels, the combustion state variable being a variable relating to a variation degree in combustion state between the cylinders, and a processor configured to execute an acquisition process and a determination process, the acquisition process being configured to acquire a value of the rotation waveform variable based on an output of a sensor that detects rotation behavior of the crankshaft and to acquire a value of the drive system rotation speed variable based on an output of a sensor that detects rotation behavior of the drive system rotating element, the determination process being configured to determine whether or not the internal combustion engine is in the predetermined operating state, based on an output value of the detection mapping that takes the value of the rotation waveform variable and the value of the drive system rotation speed variable acquired in the acquisition process as an input.

\* \* \* \* \*